(12) United States Patent
Guo et al.

(10) Patent No.: US 12,255,453 B2
(45) Date of Patent: Mar. 18, 2025

(54) METHOD FOR AGGREGATING GROUP OF ELECTRIC VEHICLES BASED ON ELECTRIC VEHICLE FLEXIBILITY, ELECTRONIC DEVICE, AND STORAGE MEDIUM

(71) Applicant: Tsinghua University, Beijing (CN)

(72) Inventors: Qinglai Guo, Beijing (CN); Mengjie Liu, Beijing (CN); Yujie Sheng, Beijing (CN)

(73) Assignee: Tsinghua University, Beijing (CN)

( * ) Notice: Subject to any disclaimer, the term of this patent is extended or adjusted under 35 U.S.C. 154(b) by 685 days.

(21) Appl. No.: 17/551,404

(22) Filed: Dec. 15, 2021

(65) Prior Publication Data

US 2023/0127845 A1    Apr. 27, 2023

(30) Foreign Application Priority Data

Oct. 27, 2021 (CN) .......................... 202111253252.1

(51) Int. Cl.
*H02J 3/00* (2006.01)
*B60L 53/66* (2019.01)
*G06Q 30/0283* (2023.01)
*H02J 7/00* (2006.01)

(52) U.S. Cl.
CPC .............. *H02J 3/003* (2020.01); *B60L 53/66* (2019.02); *G06Q 30/0283* (2013.01); *H02J 7/0014* (2013.01); *H02J 7/0048* (2020.01); *B60L 2260/54* (2013.01)

(58) Field of Classification Search
CPC ........ H02J 3/003; H02J 7/0014; H02J 7/0048; B60L 53/66; B60L 2260/54; B60L 53/64; B60L 53/67; G06Q 30/0283; G06Q 10/0631; G06Q 10/06315; Y02T 10/70; G06F 30/20

See application file for complete search history.

(56) References Cited

U.S. PATENT DOCUMENTS

| | | | |
|---|---|---|---|
| 12,065,057 B2* | 8/2024 | Ehara ..................... | B60L 55/00 |
| 2014/0046499 A1* | 2/2014 | Raskar .................... | B60L 53/65 |
| | | | 700/297 |
| 2016/0159239 A1* | 6/2016 | Shi .......................... | B60L 53/14 |
| | | | 320/134 |
| 2020/0338999 A1* | 10/2020 | Press ...................... | H04W 4/027 |

* cited by examiner

*Primary Examiner* — Zhipeng Wang
(74) *Attorney, Agent, or Firm* — Hodgson Russ LLP (57) ABSTRACT

A method for aggregating a group of EVs based on EV flexibility includes: obtaining a prediction result on a fast charging demand of each EV based on a preset model; determining a distribution area of each substation involved in an EV activity range as an aggregation area; establishing an aggregation model based on the EV fast charging demand, in which the aggregation model includes energy balance equations and various constraints; obtaining an EV fast charging load power curve and an EV energy curve of each aggregation area based on the aggregation model; determining upper and lower limits of multiple EV fast charging load power curves as a flexibility range for the EV fast charging load power, and determining upper and lower limits of multiple EV energy curves as a flexibility range for the EV energy; and aggregating a group of EVs based on the above flexibility ranges.

20 Claims, 3 Drawing Sheets

METHOD FOR AGGREGATING GROUP OF ELECTRIC VEHICLES BASED ON ELECTRIC VEHICLE FLEXIBILITY, ELECTRONIC DEVICE, AND STORAGE MEDIUM

CROSS-REFERENCE TO RELATED APPLICATION

This application claims priority to Chinese Patent Application No. 202111253252.1, filed on Oct. 27, 2021, the entire disclosure of which is incorporated by reference herein.

TECHNICAL FIELD

The disclosure relates to the field of electric vehicle load control, and particularly to a method for aggregating a group of electric vehicles (EVs) based on EV flexibility, an electronic device, and a storage medium.

BACKGROUND

The clean transportation tool such as an electric vehicle (hereinafter referred to as EV) has been developed since extensive use of fossil energy leads to a series of problems. Major countries in the world have proposed a national-level EV development plan and even a plan of banning the sale of fuel vehicles, in order to early achieve clean and electrified transportation systems. As the proportion of EVs in the future transportation network increases, the charging loads will become an important part of the power system load.

The EVs need to obtain energy from the power grid. According to the charging power, they are divided into slow charging and fast charging. When the EV is slowly charged, the parking time is usually longer than the required charging time. In other words, the charging demand at this time can be interrupted and be flexible in the time dimension. When the EV is fast charged, the EV can be flexible in the spatial dimension, for example, going to different fast charging stations under the guidance. Therefore, the EVs can be used as space-time flexible resources when they participate in grid dispatching from the time and spatial dimensions as portable energy storage devices.

SUMMARY

According to a first aspect of the disclosure, a method for aggregating a group of electric vehicles (EVs) based on EV flexibility includes: obtaining a prediction result on a fast charging demand of each EV based on a preset EV trip chain model; determining a distribution area of each substation involved in an activity range of the EVs as an aggregation area, wherein a number of aggregation areas is equal to a number of substations within the activity range of the EVs; establishing an area-based aggregation model based on the fast charging demand of each EV, in which the aggregation model includes energy balance equations, energy constraints, power constraints, time coupling constraints and spatial coupling constraints; obtaining an EV fast charging load power curve and an EV energy curve of each aggregation area based on the area-based aggregation model; determining upper and lower limits of multiple EV fast charging load power curves as a flexibility range for the EV fast charging load power in the aggregation area, and determining upper and lower limits of multiple EV energy curves as a flexibility range for the EV energy in the aggregation area; and aggregating a group of EVs based on the flexibility range for the EV fast charging load power and the flexibility range for the EV energy in each aggregation area.

According to a second aspect of the disclosure, an electronic device includes at least one processor and a memory communicatively connected with the at least one processor. The memory stores instructions that can be executed by the at least one processor. When the instructions are executed by the at least one processor, the at least one processor is configured to obtain a prediction result on a fast charging demand of each EV based on a preset EV trip chain model; determine a distribution area of each substation involved in an activity range of the EVs as an aggregation area, in which a number of aggregation areas is equal to a number of substations within the activity range of the EVs; establish an area-based aggregation model based on the fast charging demand of each EV, in which the aggregation model includes energy balance equations, energy constraints, power constraints time coupling constraints and spatial coupling constraints; obtain an EV fast charging load power curve and an EV energy curve of each aggregation area based on the area-based aggregation model; determine upper and lower limits of multiple EV fast charging load power curves as a flexibility range for the EV fast charging load power in the aggregation area, and determining upper and lower limits of multiple EV energy curves as a flexibility range for the EV energy in the aggregation area; and aggregate a group of EVs based on the flexibility range for the EV fast charging load power and the flexibility range for the EV energy in each aggregation area.

According to a third aspect of the disclosure, a non-transitory computer readable storage medium has computer instructions stored thereon. When the instructions are executed by a computer, the computer is caused to implement the method according to a first aspect is implemented.

The additional aspects and advantages of the disclosure will be set forth in the following specification, and will become obvious from the following description, or may be learned by practice of the disclosure.

DETAILED DESCRIPTION

Embodiments of the disclosure are described in detail below, and examples of embodiments are illustrated in the accompanying drawings, in which the same or similar reference numbers represent the same or similar elements or elements with the same or similar functions. The embodiments described below with reference to the drawings are exemplary, are intended to explain the present disclosure and are not to be construed as a limitation of the disclosure.

However, on the one hand, the flexibility provided by a single vehicle is limited, and the uncertainty caused by its behavior changes cannot be offset; on the other hand, an optimization speed of the power grid may be greatly reduced when each individual vehicle in the EV group independently participates in the grid dispatching. Therefore, the EVs need to be aggregated to form large-scale and centralized flexible resources when they participate in the grid dispatching. Most of the existing methods employ the EV flexibility from the time dimension during the process of aggregating the EV flexibility, but do not sufficiently explore the EV flexibility from the spatial dimension.

In order to overcome the shortcomings in the related art that the existing method does not fully explore the EV flexibility from the spatial dimension, the disclosure proposes a method and an apparatus for calculating flexibility of an EV group. With the method of the disclosure, the flexibility of a single EV with dispersed and small capacity is aggregated to obtain centralized and large-capacity flexibility, and an aggregation model is established based on spatial areas, in which the model describes a feasible domain of a fast charging load power and energy of the EV in each area. The model uses a binary marking variable to record a state of EV, and determines a flexibility aggregation area under price changes of charging stations in consideration of energy balance equations and space-time coupling constraints. The flexibility aggregation areas can be applied for the EV group to efficiently participate in the grid dispatching.

The method and the apparatus for calculating flexibility of an EV group in the embodiments of the disclosure are described below with reference to the accompanying drawings.

Figure 1:
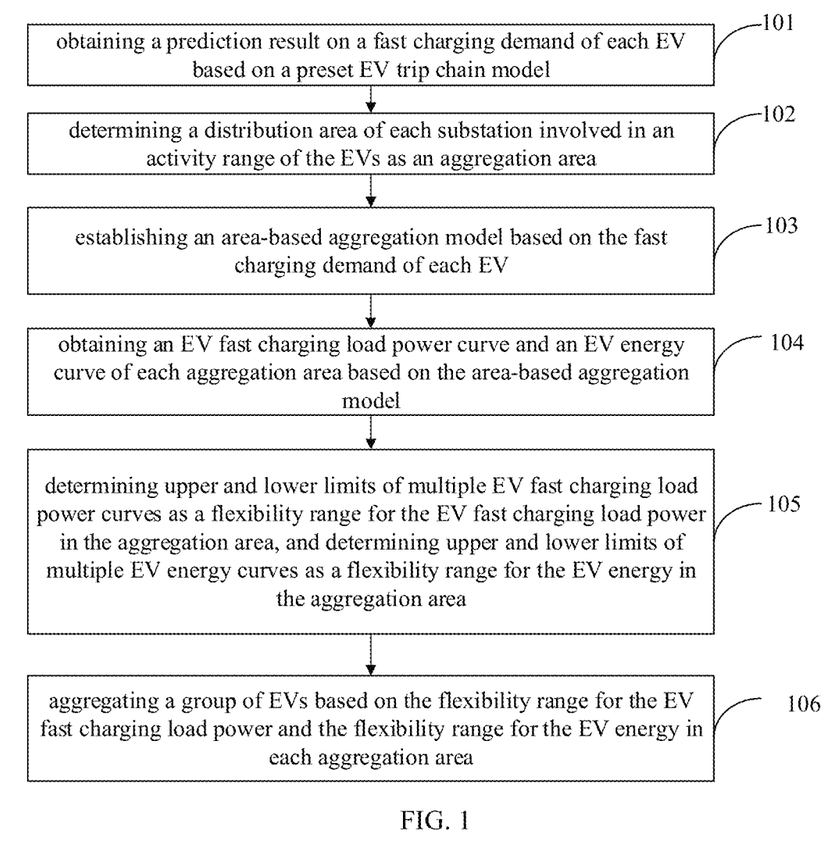
FIG. 1 is a flowchart of a method for aggregating a group of electric vehicles (EVs) based on EV flexibility according to an embodiment of the disclosure.

FIG. 1 is a flowchart of a method for aggregating a group of EVs based on EV flexibility according to the embodiment of the disclosure. The method comprehensively considers the time and space coupling properties of the flexibility of EVs, and describes a feasible domain of a fast charging load power and energy of the EV in each area. All areas in the aggregation area can be realized by changing the price of fast charging stations in the space. The method can aggregate a group of EVs with fast charging demands into a model functioned as a device or a system. As illustrated in FIG. 1, the method includes the following steps.

At block 101, a prediction result on a fast charging demand of the EV is obtained based on a preset EV trip chain model.

In an embodiment of the disclosure, the fast charging demand of each EV is predicted based on an EV trip chain model.

Figure 2:
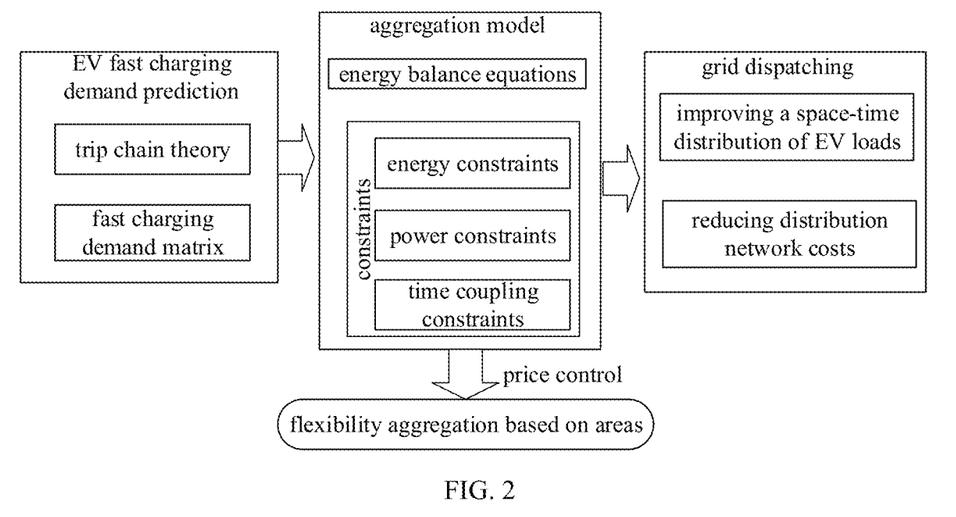
FIG. 2 is an overall flowchart of a method for aggregating a group of EVs based on EV flexibility according to an embodiment of the disclosure.

The EV trip chain model is established. FIG. 2 is a schematic diagram of a trip chain model for use of predicting a fast charging demand of the EV according to an embodiment of the disclosure. As shown in FIG. 2, the trip chain model is used to describe trip transfer situations of the EV over the time and space, and to predict important behaviors such as vehicle driving, charging, and stationary. The trip chain includes a space chain, a time chain, and an energy chain. FIG. 2(a) illustrates a space chain for recording a travel site and a travel distance of an EV, and providing distance information in selecting a fast charging station (hereinafter referred to as FCS). FIG. 2(b) illustrates a time chain responsible for recording a time node of an important event during the driving process, such as start end time for vehicle charging, and providing time cost information in selecting the FCS. FIG. 2(c) illustrates an energy chain for predicting a state-of charge (SOC) of the vehicle and determining whether to perform fast charging.

The illustrations shown in FIG. 2 are explained as follows: $d_{k-1}^{i}$ is a distance from the node k−1 to the fast charging station $FCS_i$, $d_i^k$ is a distance from the $FCS_i$ to the node k, $td_{k-1,i}^{j}$ is a moment when the vehicle j leaves the node k−1, $t_{k-1,i}^{j}$ is the time required for the vehicle j from the node k−1 to the $FCS_i$, $ta_i^j$ is a moment when the vehicle j reaches the $FCS_i$, $ts_i^j$ is the time for the vehicle j parking in the $FCS_i$, $td_i^j$ is a moment when the vehicle j leaves the $FCS_i$, $t_{i,k}^j$ is the time required for the vehicle j to go from the $FCS_i$ to the node k, $ta_k^j$ is a moment when the vehicle j reaches the node k, $E_{k-1}^j$ is the energy carried when the vehicle j leaves the node k−1, $\Delta E_{k-1,i}^j$ is the energy consumed by the vehicle j from the node k−1 to the $FCS_i$, $Ea_i^j$ is the energy carried when the vehicle j reaches the $FCS_i$, $\Delta E_i^j$ is an energy increase when the vehicle j parks in the $FCS_i$, $Ed_i^j$ is the energy carried when the vehicle j leaves the $FCS_i$, $\Delta E_{i,k}^j$ is the energy consumed by the vehicle j from the $FCS_i$ to the node k, and $E_k^j$ is the energy carried when the vehicle j reaches the node k.

In an embodiment, obtaining the prediction result on the fast charging demand of each EV includes the following steps.

1) a trip time period $[t_0, t_{end}]$ to be predicted is selected for each EV, the following items are obtained for each EV to be aggregated at the moment $t_0$: a location node distribution, a SOC, a battery capacity, energy consumption per unit distance $e_n$, and a SOC value $Rsoc^j$ when each vehicle has a fast charging demand.

2) the trip chain model is used to obtain all subsequent location nodes of each EV belonging to the time period $[t_0, t_{end}]$, a moment reaching each subsequent location node, and a SOC value of each EV reaching each subsequent location node, so as to obtain a prediction result on the charging demand of each EV during the time period.

In an embodiment, when the SOC value of each EV reaching a certain node (for example, the node k) is less than the corresponding value $Rsoc^j$, there may be a fast charging demand during a trip from the node k−1 to the node k. At this time, the following information needs to be obtained and recorded in a fast charge demand matrix FC: a vehicle serial number, start and end points of the trip, the selected FCS, start and end time for charging, SOC values at the start and end time for charging.

At block 102, a distribution area of each substation involved in an activity range of the EVs is determined as an aggregation area. A number of aggregation areas is equal to a number of substations within the activity range of the EVs.

In an embodiment, the activity range of N EVs to be aggregated are divided into A aggregation areas, where A is a number of all substations within the vehicle activity range and the area serial number is $a \in \{1,2,3, \ldots, A\}$. An aggregation area corresponds to a distribution area of a substation. The number of EVs to be aggregated in all areas is N and the vehicle serial number is $n \in \{1,2,3, \ldots, N\}$.

At block 103, an area-based aggregation model is established based on the fast charging demand of each EV. The aggregation model includes energy balance equations, energy constraints, power constraints time coupling constraints and spatial coupling constraints.

For each area, an energy balance equation is established as follows:

$$E_{a,t} = E_{a,t-\Delta t} + \eta P_{a,\Delta t} \Delta t + E_{a,\Delta t}^{arr} - E_{a,\Delta t}^{dep} - E_{a,\Delta t}^{con} \quad (1)$$

where $E_{a,t}$ is a total energy of EVs located in the area a at the moment t, $E_{a,t-\Delta t}$ is a total energy of EVs located in the area a at the moment t−Δt, η is a conversion efficiency for a charging pile charging to an EV, $P_{a,\Delta t}$ an is average output power of the charging stations in the area a within the time interval Δt, $\eta P_{a,\Delta t}\Delta t$ represents electric quantities of EVs charged by the charging stations in the area a within the time interval Δt, $E_{a,\Delta t}^{arr}$ is the energy carried by the EVs reaching the area a within the time interval Δt, $E_{a,\Delta t}^{dep}$ is the energy carried by the EVs leaving the area a within the time interval Δt, and $E_{a,\Delta t}^{con}$ is the energy consumed by the EVs driving in the area a within the time interval Δt. In the embodiment, considering that the time interval Δt is relatively small, an EV may drive across the area at most for one time.

$$\eta P_{a,\Delta t}\Delta t = \int_{t-\Delta t}^{t}\left(\sum_{n=1}^{N}\beta_{n,a}(t)\eta P_{cha}\right)dt \quad (2)$$

$$E_{a,\Delta t}^{arr} = \sum_{n=1}^{N}\left(E_n^{latest} - \int_{t_n^{latest}}^{t_n^{arr}}e_n\left(1 - \sum_{a=1}^{A}\gamma_{n,a}(t)\right)dt\right) \quad (3)$$

$$E_{a,\Delta t}^{dep} = \sum_{n=1}^{N}\left(E_n^{latest} - \int_{t_n^{latest}}^{t_n^{dep}}e_n\left(1 - \sum_{a=1}^{A}\gamma_{n,a}(t)\right)dt\right) \quad (4)$$

$$E_{a,\Delta t}^{con} = \int_{t-\Delta t}^{t}\left(\sum_{n=1}^{N}\alpha_{n,a}(t)(1 - \gamma_{n,a}(t))e_n\right)dt \quad (5)$$

where $P_{cha}$ is a charging power of a single charging pile (assuming that the charging power of each charging pile is identical), $E_n^{latest}$ is the energy of the vehicle n at the moment $t_n^{latest}$ when the latest charging is completed, $t_n^{arr}$ corresponds to a moment when a value of $\alpha_{n,a}(t)$ changes from 0 to 1, $t_n^{dep}$ corresponds to a moment when a value of $\alpha_{n,a}(t)$ changes from 1 to 0, $e_n$ is energy consumption of the vehicle n per unit time. Since the energy when a vehicle enters a certain area is the same as the energy when the vehicle leaves another area, it is determined that $$\sum_{a=1}^{A}E_{a,\Delta t}^{arr} = \sum_{a=1}^{A}E_{a,\Delta t}^{dep}$$

from an overall view. $\alpha_{n,a}(t)$, $\beta_{n,a}(t)$ and $\gamma_{n,a}(t)$ are binary marking variables for recording changes in the space position and states of the EV reflected by the trip chain and the fast-charging demand matrix FC. $\alpha_{n,a}(t)$ represents an area marking variable of the vehicle n in the area a, in which $\alpha_{n,a}(t)=1$ when the vehicle n is located in the area a at the moment t and $\alpha_{n,a}(t)=0$ when the vehicle n is not located in the area a at the moment t. $\beta_{n,a}(t)$ is a SOC marking variable of the vehicle n in the area a, in which $\beta_{n,a}(t)=1$ when the vehicle n is charged in the area a at the moment t and $\beta_{n,a}(t)=0$ when the vehicle n is not charged in the area a at the moment t. $\gamma_{n,a}(t)$ is a marking variable of a driving state of the vehicle n in the area a, in which $\gamma_{n,a}(t)=1$ when the vehicle n is still in the area a at the moment t and $\gamma_{n,a}(t)=0$ when the vehicle n is not still in the area a at the moment t.

There is a relationship shown in equation (6) and equation (7) between the above-mentioned marking variables.

$$\beta_{n,a}(t) \leq \gamma_{n,a}^{(t)} \leq \alpha_{n,a}(t) \quad (6)$$

$$\sum_{a=1}^{A}\alpha_{n,a}(t) = 1 \quad (7)$$

In the embodiment, constraints of the aggregation model are determined. The equations (8) to (11) correspond to energy constraints, power constraints, time coupling constraints, and space coupling constraints, respectively. The energy constraints come from the fact that the EV battery cannot be overcharged and over-discharged. The power constraints come from the limited charging pile power. As it takes time for EVs to transfer across the areas, time coupling constraints are established based on the ramp rate of a generator. As a single EV does not appear in each area at the same time, the spatial coupling constraints ensure that the load in each area may not take a large or small value at the same time.

$$E_{a,t}^{min} \leq E_{a,t} \leq E_{a,t}^{max} \quad (8)$$

$$P_{a,\Delta t}^{min} \leq P_{a,\Delta t} = \sum_{n=1}^{N}\beta_{n,a}P_{cha} \leq P_{a,\Delta t}^{max} \quad (9)$$

$$\Delta P^{min} \leq P_{a,t} - P_{a,t-\Delta t} \leq \Delta P^{max} \quad (10)$$

$$\left(\sum_{a=1}^{A}P_{a,t}\right)^{min} \leq \sum_{a=1}^{A}P_{a,t} \leq \left(\sum_{a=1}^{A}P_{a,t}\right)^{max} \quad (11)$$

where $E_{a,t}^{max}$ is an upper limit of a total energy of EVs located in the area a at the moment t, $E_{a,t}^{min}$ is a lower limit of a total energy of EVs located in the area a at the moment t, $P_{a,\Delta t}^{max}$ is an upper limit of an average output power of a charging station in the area a within the time interval Δt, $P_{a,\Delta t}^{min}$ is a lower limit of the average output power of the charging station in the area a within the time interval Δt, $P_{a,t}$ is an output power of the charging station in the area a at the moment t, $P_{a,t-\Delta t}$ is an output power of the charging station in the area a at the moment t−Δt, $\Delta P^{max}$ is an upper limit of a power difference between $P_{a,t}$ and $P_{a,t-\Delta t}$ (an upper limit of a power difference due to the time required for the space transfer of the vehicle), $\Delta P^{min}$ is a lower limit of the power difference between $P_{a,t}$ and $P_{a,t-\Delta t}$ (a lower limit of the power difference due to the time required for the space transfer of the vehicle), $$\sum_{a=1}^{A}P_{a,t}$$

is a sum of output powers of the charging stations in A areas at the moment t, $$\left(\sum_{a=1}^{A}P_{a,t}\right)^{max}$$

is an upper limit of the sum of the output powers of charging stations in A areas at the moment t (an upper limit due to the spatial coupling of EVs only charging in an area at a moment), $$\left(\sum_{a=1}^{A} P_{a,t}\right)^{min}$$

is a lower limit of the sum of the output powers of the charging stations in A areas at the moment t (a lower limit due to the spatial coupling of EVs only charging in an area at a moment).

At block 104, an EV fast charging load power curve and an EV energy curve of each aggregation area are obtained based on the area-based aggregation model.

At block 105, upper and lower limits of multiple EV fast charging load power curves are determined as a flexibility range for the EV fast charging load power in the aggregation area, and upper and lower limits of multiple EV energy curves are determined as a flexibility range for the EV energy in the aggregation area.

Figure 3:
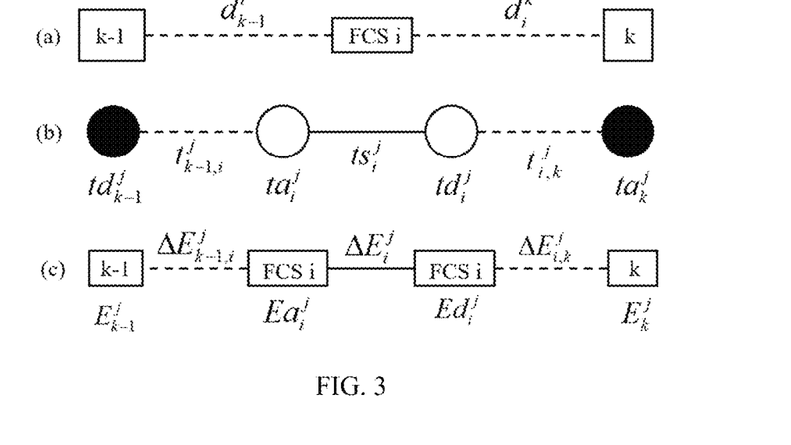
FIG. 3 is a schematic diagram of a trip chain model for use of predicting a fast charging demand of the EV according to an embodiment of the disclosure.
Figure 4:
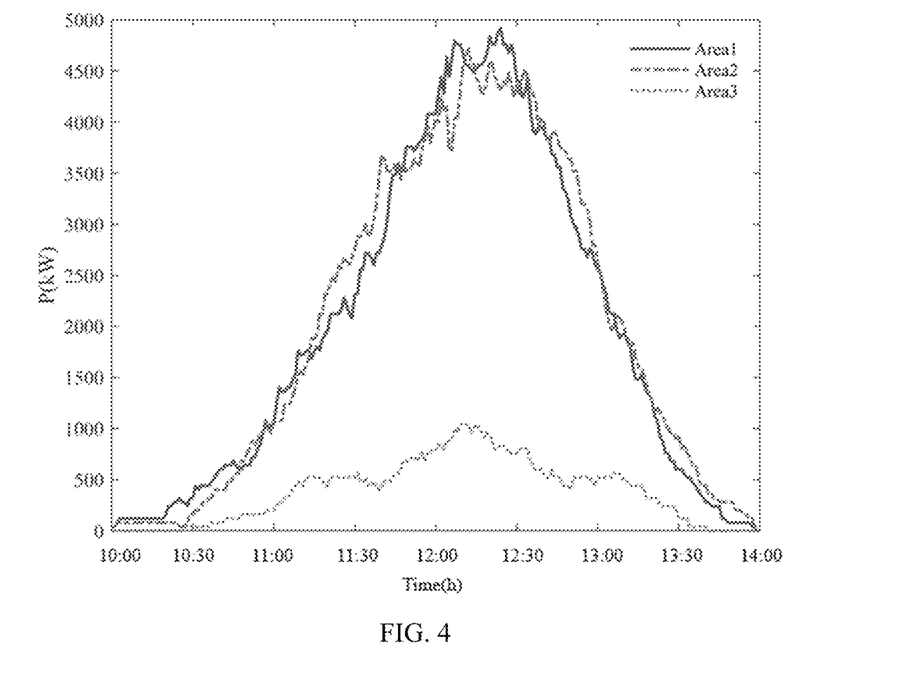
FIG. 4 is a schematic diagram of a space-time distribution for an EV fast charging power in various areas under a specified price in the future four hours according to an embodiment of the disclosure.
Figure 5:
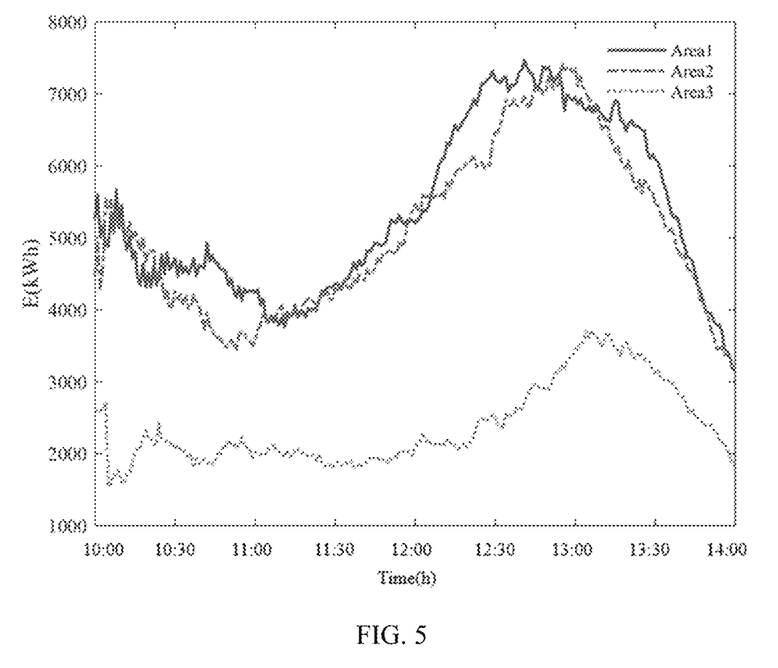
FIG. 5 is a schematic diagram of a space-time distribution of EV energy in various areas under a specified price in the future four hours according to an embodiment of the disclosure.

In an embodiment of the disclosure, an aggregation area is determined under FCS price changes. FIG. 3 illustrates a curve of a fast charging power $P_{a,\Delta t}$ of the EV in an area over time and space within the forecast time period $[t_0, t_{end}]$ under a certain set price (such as, $p=(p_1,p_2, \ldots ,p_a, \ldots ,p_A)$, where $p_a$ is a set price of the area a). FIG. 4 illustrates a curve of the energy $E_{a,t}$ carried by the EV in an area over time and space within the forecast time period $[t_0, t_{end}]$ under the set price.

In an embodiment of the disclosure, a number of areas A=3 and three curves are respectively presented in FIG. 3 and FIG. 4. Each curve in FIG. 3 represents the fast charging power $P_{a,\Delta t}$ of the EV changes over time in an area (e.g., Area 1/Area 2/Area 3) within the prediction period [10:00, 14:00]. Each curve in FIG. 4 represents the EV energy $E_{a,t}$ changes over time in an area (e.g., Area 1/Area 2/Area 3) within the prediction period [10:00, 14:00]. In order to obtain the flexibility of the EV group under the control of price changes, it is assumed that each area has a price range with upper and lower limits, that is, $\check{p}_a \leq p_a \leq \hat{p}_a$ (a∈ A), where $\hat{p}_a$ is an upper limit of the charging price range of the area a and $\check{p}_a$ is a lower limit of the charging price range of the area a. As the user behavior in selecting a FCS is related to area price ratios $p_1:p_2: \ldots :p_A$. After the upper and lower limits of the price range are set for each area, an extreme price is defined as one from a combination that includes upper and lower limits of the price range in each area. Since the number of areas is A, there are $2^A$ extreme prices and a set of extreme prices is denoted as $P_\Omega$. The extreme situation of each area price ratio may appear in the set $P_\Omega$. In order to obtain the aggregation area under the price change, a combination of prices in each area is set to have any extreme price in the set $P_\Omega$, then each aggregation area can obtain $2^A$ curves that the fast charging load power changes over time and $2^A$ curves that the energy changes over time, shown in FIG. 3 and FIG. 4, respectively. Finally, corresponding to the aggregation area, a flexibility range of the EV group considering price changes is composed of upper and lower limits in the range of $2^A$ curves, in which the flexibility range of the fast charging load power is composed of upper and lower limits in the range of $2^A$ curves indicating that the fast charging load power changes over time, and the flexibility range of energy is composed of upper and lower limits in the range of $2^A$ curves indicating that the energy changes over time.

At block 106, a group of EVs is aggregated based on the flexibility range for the EV fast charging load power and the flexibility range for the EV energy in each aggregation area.

In an embodiment, after obtaining the flexibility range of EVs corresponding to each aggregation area embodied by the aggregation model, it can be applied to scenarios such as peak load regulation of power grid, congestion elimination, and renewable energy consumption. The embodiment of the disclosure takes cost reduction of the power grid as an example for illustrating the way of participating in the power grid dispatching.

The fast-charging load $P_{a,\Delta t}$ of each area is connected to a distribution network node corresponding to a substation in each area. The distribution network takes minimizing a sum of multi-period power generation costs Z as an objective function in the equation (12), multi-period optimal power flow optimization is used in combination with the variable ranges of $P_{a,\Delta t}$ and $E_{a,t}$ over time and space (which are embodied by constraints for the aggregation area), to improve space-time distribution of the EV load in various areas and reduce the cost of the distribution network.

$$Z = \min \sum_{t=t_0}^{t_{end}} \sum_{i \in G} F_i(P_{Gi}) = \min \sum_{t=t_0}^{t_{end}} \sum_{i \in G} \left(a_{2i}P_{Gi}^2 + a_{1i}P_{Gi} + a_{0i}\right) \quad (12)$$

where i represents a generator serial number, G is a set of generator serial numbers, $P_{Gi}$ is the power generated by the generator i, $F_i(P_{Gi})$ represents a cost characteristic curve of the generator, $a_{2i}$, $a_{1i}$ and $a_{0i}$ are respective parameters of the cost characteristic curve.

With the above method in the disclosure, the centralized, large-capacity, and deterministic flexible resources are obtained by aggregating fast-charging EV loads based on areas, and an aggregation model is established that comprehensively considers time coupling and spatial coupling, thereby improving spatial distribution of charging loads, which can make the EVs participate in the grid dispatching more efficiently.

In order to implement the above-mentioned embodiments, a second aspect of the disclosure provides an apparatus for calculating flexibility of an electric vehicle (EV) group. The apparatus includes a fast charging demand predicting module, an aggregation model constructing module, and a flexibility calculating module.

The fast charging demand predicting module is configured to obtain a prediction result on a fast charging demand of the EV based on a preset EV trip chain model. The aggregation model constructing module is configured to determine a power distribution area of a substation within an activity range of the EV as an aggregation area, and establish an area-based aggregation model of the EV for the aggregation area based on the fast charging demand of the EV. The flexibility calculating module is configured to obtain a flexibility range for a fast charging load power and a flexibility range for energy of the EV in the aggregation area by obtaining a fast charging load power curve and an energy curve of the EV corresponding to the aggregation area based on the area-based aggregation model.

In order to implement the above-mentioned embodiments, a third aspect of embodiments of the disclosure provides an electronic device. The electronic device includes at least one processor and a memory communicatively connected with the at least one processor. The memory stores instructions that can be executed by the at least one processor. When the instructions are executed by the at least one processor, the above-mentioned method for distribution of an EV group is implemented.

In order to implement the above-mentioned embodiment, a fourth aspect of embodiments of the disclosure provides a computer-readable storage medium having computer instructions stored thereon. When the instructions are executed by a computer, the computer is caused to implement the above-mentioned method for distribution of an EV group.

It should be noted that the above-mentioned computer-readable medium in the disclosure may be a computer-readable signal medium or a computer-readable storage medium, or their combination. The computer-readable storage medium may be, for example, but not limited to, an electrical, magnetic, optical, electromagnetic, infrared, or semiconductor system, apparatus, or device, or their combination. More specific examples of computer-readable storage media may include, but are not limited to: electrical connections with one or more wires, portable computer disks, hard disks, a random access memory (RAM), a read-only memory (ROM), an erasable removable programmable read-only memory (EPROM or flash memory), optical fibers, a portable compact disk read-only memory (CD-ROM), an optical storage device, a magnetic storage device, or any suitable combination of the above. In the disclosure, a computer-readable storage medium may be any tangible medium that contains or stores programs, and the programs may be used by or in combination with an instruction execution system, apparatus, or device. In the disclosure, a computer-readable signal medium may include a data signal propagated in a baseband or as a part of a carrier wave where a computer-readable program code is carried therein. This propagated data signal can take many forms, including but not limited to electromagnetic signals, optical signals or any suitable combination of the above. The computer-readable signal medium may also be any computer-readable medium other than the computer-readable storage medium. The computer-readable signal medium may send, propagate, or transmit the programs for use by or in combination with the instruction execution system, apparatus, or device. The program codes contained on the computer-readable medium can be transmitted by any suitable medium, including but not limited to: wires, optical cables, RFs (Radio Frequency), etc., or any suitable combination of the above.

The above-mentioned computer-readable medium may be included in the above-mentioned electronic device, or may exist alone without being assembled into the electronic device. The above-mentioned computer-readable medium carries one or more programs, and when the one or more programs above-mentioned are executed by the electronic device, the electronic device is caused to execute the method for distribution of an EV group in the above embodiment.

The computer program codes for performing operations of the disclosure can be written in one or more programming languages or a combination thereof. The above-mentioned programming languages include object-oriented programming languages (such as Java, Smalltalk, C++), and conventional procedural programming language (such as "C" language or similar programming language. The program codes can be executed entirely on the user computer, partly on the user computer, executed in an independent software package, partly on the user computer and partly executed on a remote computer, or entirely executed on the remote computer or server. Involving in the remote computer, the remote computer can be connected to the user computer through any kind of networks including a local area network (LAN) or a wide area network (WAN), or can be connected to an external computer (for example, through Internet connections by using an Internet service provider).

descriptions with reference to terms "an embodiment", "some embodiments", "example", "specific example" or "some examples" mean specific features, structures, materials or characteristics described in combination with the embodiment or example are included in at least an embodiment or example of the disclosure. The schematic representations of the above terms do not have to be the same embodiment or example. Moreover, specific features, structures, materials or characteristics described may be combined in one or more embodiments or examples in a suitable manner. Furthermore, embodiments or examples described in the specification, as well as features of embodiments or examples, may be combined without conflicting with each other.

In addition, the terms "first" and "second" are only for describing purposes and are not to be construed as indicating or implying relative importance or implicitly indicating the number of technical features indicated. Thus, features limiting "first" and "second" may explicitly or implicitly include at least one of the features. In the description of the disclosure, the wording "a plurality of" means at least two, for example, two, three, unless otherwise expressly and specifically stated.

Any process or method described in the flowchart or otherwise described herein may be understood as representing one or more modules, segments, or portions of codes of executable instructions for implementing the blocks of a customized logical function or process, and the scope of the embodiments of the disclosure includes additional implementations, in which the functions may be executed not in the sequence shown or discussed, including in a substantially simultaneous manner or in a reverse sequence, which will be appreciated by those skilled in the art the embodiments of the disclosure belong to.

The logics and/or blocks represented in the flowchart or described in other ways herein, for example, may be considered as an ordered list of executable instructions configured to implement logic functions, which may be specifically implemented in any computer readable medium for use by a system, an apparatus or a device for executing instructions (such as a computer-based system, a system including a processor, or other systems that may obtain and execute instructions from a system, an apparatus or a device for executing instructions) or in combination with the system, the apparatus or the device for executing instructions. A "computer readable medium" in the disclosure may be an apparatus that may contain, store, communicate, propagate or transmit a program for use by a system, an apparatus or a device for executing instructions or in combination with the system, the apparatus or the device for executing instructions. A more specific example (a non-exhaustive list) of a computer readable medium includes the followings: an electronic connector (an electronic apparatus) with one or more cables, a portable computer disk box (a magnetic device), a random access memory (RAM), a read-only memory (ROM), an electrically programmable read-only memory (an EPROM or a flash memory), an optical fiber apparatus, and a portable optical disk read-only memory (CDROM). In addition, a computer readable medium even may be paper or other suitable medium on which a program may be printed, since paper or other medium may be optically scanned, and then edited, interpreted or processed in other suitable ways if necessary to obtain a program electronically and store it in a computer memory.

It should be understood that all parts of the disclosure may be implemented with hardware, software, firmware and their combination. In the above embodiment, a plurality of blocks or methods may be stored in a memory and implemented by software or firmware executed by a suitable system for executing instructions. For example, if implemented with a hardware, they may be implemented by any of the following technologies or their combinations known in the art as in another implementation: discrete logic circuits with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of blocks in the above method embodiments may be implemented by instructing relevant hardware by computer programs. The programs may be stored in a computer readable storage medium, and the programs may include one of blocks of the method embodiments or their combination when executed.

In addition, functional units in the embodiments of the disclosure may be integrated in one processing module, or each of the units may be physically existed alone, or two or more units may be integrated in one module. The integrated module may be achieved by a form of hardware, and also may be achieved by a form of a software functional module. The integrated module may be stored in a computer readable storage medium when it is implemented in a form of a software functional module and sold or used as an independent product.

The above storage medium may be a read-only memory, a magnetic disk or an optical disk. Even though embodiments of the disclosure have been illustrated and described above, it may be understood by those skilled in the art that various changes, modifications, substitutions and alterations may be made for the embodiments without departing from the principles and spirit of the disclosure, and the scope of the disclosure is defined by claims and their equivalents.

What is claimed is:

1. A method for distribution network optimization, comprising:
    obtaining a prediction result on a fast charging demand of each electric vehicle (EV) of a group of EVs based on a preset EV trip chain model;
    determining a distribution area of each substation involved in an activity range of the EVs as an aggregation area, wherein a number of aggregation areas is equal to a number of substations within the activity range of the EVs;
    establishing an area-based aggregation model based on the fast charging demand of each EV, in which the aggregation model includes energy balance equations, energy constraints, power constraints, time coupling constraints and spatial coupling constraints;
    obtaining an EV fast charging load power curve and an EV energy curve of each aggregation area based on the area-based aggregation model;
    determining upper and lower limits of multiple EV fast charging load power curves as a power flexibility range for the EV fast charging load power in the aggregation area, and determining upper and lower limits of multiple EV energy curves as an energy flexibility range for the EV energy in the aggregation area; and
    providing the power flexibility range and the energy flexibility range for a distribution network node corresponding to a substation in each aggregation area, and dispatching the group of EVs in a power grid by using multi-period optimal power flow optimization in combination with the power flexibility range and the energy flexibility range.

2. The method of claim 1, wherein the EV trip chain model comprises:
    a space chain, configured to record a travel site and a travel distance of the EV;
    a time chain, configured to record various time nodes in the driving process of the EV; and
    an energy chain, configured to predict a state-of charge (SOC) of the EV.

3. The method of claim 1, wherein obtaining the prediction result on the fast charging demand of each EV comprises:
    selecting a trip time period $[t_0,t_{end}]$ to be predicted of each EV, and for each EV at the moment $t_0$, obtaining a location node distribution, a SOC, a battery capacity, energy consumption per unit distance $e_n$, and a SOC value Rsoc$^j$ (j∈{1,2,3, . . . ,N}, N is a total number of EVs) when each EV has a fast charging demand; and
    determining the prediction result on the fast charging demand of each EV in the time period $[t_0,t_{end}]$ by obtaining all subsequent location nodes of each EV in the time period, a moment of each EV reaching each subsequent location node, and a SOC value of each EV reaching each subsequent location node, wherein there is a fast charging demand for any EV j from a location node k-1 to a location node k when the SOC value of the EV j reaching the location node k is less than the corresponding value Rsoc$^j$.

4. The method of claim 3, further comprising:
    establishing a fast charging demand matrix to store the prediction result on the fast charging demand, wherein the fast charge demand matrix comprises a vehicle serial number, start and end points of a trip with the fast charging demand, a selected fast charging station (FCS), start and end time for charging, SOC values at the start and end time for charging.

5. The method of claim 1, wherein the energy balance equation for each aggregation area is expressed by $$E_{a,t}=E_{a,t-\Delta t}+\eta P_{a,\Delta t}\Delta t+E_{a,\Delta t}^{arr}-E_{a,\Delta t}^{dep}-E_{a,L}^{coi}$$

where $E_{a,t}$ is a total energy of EVs located in the area a at the moment t, $E_{a,t-\Delta t}$ is a total energy of EVs located in the area a at the moment $t-\Delta t$, $\eta$ is a conversion efficiency for a charging pile charging to an EV, $P_{a,\Delta t}$ is an average output power of the charging stations in the area a within the time interval $\Delta t$, $\eta P_{a,\Delta t}\Delta t$ represents electric quantities of EVs charged by the charging stations in the area a within the time interval $\Delta t$, $E_{a,\Delta t}^{arr}$ is the energy carried by the EVs reaching the area a within the time interval, $\Delta t$, $E_{a,\Delta t}^{dep}$ is the energy carried by the EVs leaving the area a within the time interval $\Delta t$, and $E_{a,\Delta t}^{con}$ is the energy consumed by the EVs driving in the area a within the time interval $\Delta t$;

$$\eta P_{a,\Delta t}\Delta t = \int_{t-\Delta t}^{t}\left(\sum_{n=1}^{N}\beta_{n,a}(t)\eta P_{cha}\right)dt$$

$$E_{a,\Delta t}^{arr} = \sum_{n=1}^{N}\left(E_n^{latest} - \int_{t_n^{latest}}^{\tau_n^{arr}}e_n\left(1 - \sum_{a=1}^{A}\gamma_{n,a}(t)\right)dt\right)$$

$$E_{a,\Delta t}^{dep} = \sum_{n=1}^{N}\left(E_n^{latest} - \int_{t_n^{latest}}^{\tau_n^{dep}}e_n\left(1 - \sum_{a=1}^{A}\gamma_{n,a}(t)\right)dt\right)$$

$$E_{a,\Delta t}^{con} = \int_{t-\Delta t}^{t}\left(\sum_{n=1}^{N}\alpha_{n,a}(t)(1 - \gamma_{n,a}(t))e_n\right)dt$$

where A is a total number of aggregation areas, N is a total number of EVs; $P_{cha}$ is a charging power of a single charging pile, $E_n^{latest}$ is the energy of the vehicle n at the moment $t_n^{latest}$ when the latest charging is completed, $t_n^{arr}$ corresponds to a moment when a value of $\alpha_{n,a}(t)$ changes from 0 to 1, $t_n^{dep}$ corresponds to a moment when a value of $\alpha_{n,a}(t)$ changes from 1 to 0, $e_n$ is energy consumption of the vehicle n per unit time, $\alpha_{n,a}(t)$ $\beta_{n,a}(t)$ and $\gamma_{n,a}(t)$ are binary marking variables, $\alpha_{n,a}(t)$ represents an area marking variable of the vehicle n in the area a, in which $\alpha_{n,a}(t)=1$ when the vehicle n is located in the area a at the moment t and $\alpha_{n,a}=0$ when the vehicle n is not located in the area a at the moment t; $\beta_{n,a}(t)$ is a SOC marking variable of the vehicle n in the area a, in which $\beta_{n,a}(t)=1$ when the vehicle n is charged in the area a at the moment t and $\beta_{n,a}(t)=0$ when the vehicle n is not charged in the area a at the moment t; $\gamma_{n,a}(t)$ is a marking variable of a driving state of the vehicle n in the area a, in which $\gamma_{n,a}(t)=1$ when the vehicle n is still in the area a at the moment t and $\gamma_{n,a}(t)=0$ when the vehicle n is not still in the area a at the moment t; $\alpha_{n,a}(t)$, $\beta_{n,a}(t)$ and $\gamma_{n,a}(t)$ are expressed by $$\beta_{n,a}(t) \leq \gamma_{n,a}(t) \leq \alpha_{n,a}(t)$$

$$\sum_{a=1}^{A}\alpha_{n,a}(t) = 1$$

6. The method of claim 1, wherein the energy constraints are expressed by $$E_{a,t}^{min} \leq E_{a,t} \leq E_{a,t}^{max}$$

where $E_{a,t}^{max}$ is an upper limit of a total energy of EVs located in the area a at the moment t, $E_{a,t}^{min}$ is a lower limit of a total energy of EVs located in the area a at the moment t;
the power constraints are expressed by $$P_{a,\Delta t}^{min} \leq P_{a,\Delta t} = \sum_{n=1}^{N}\beta_{n,a}P_{cha} \leq P_{a,\Delta t}^{max}$$

where $P_{a,\Delta t}^{max}$ is an upper limit of an average output power of a charging station in the area a within the time interval $\Delta t$ and $p_{a,\Delta t}^{min}$ is a lower limit of the average output power of the charging station in the area a within the time interval $\Delta t$;
the time coupling constraints are expressed by $$\Delta p^{min} \leq P_{a,t} - P_{a,t-\Delta t} \leq \Delta p^{max}$$

where $P_{a,t}$ is an output power of the charging station in the area a at the moment t, $P_{a,t-\Delta t}$ is an output power of the charging station in the area a at the moment t-$\Delta t$, $\Delta p^{max}$ is an upper limit of a power difference between $P_{a,t}$ and $P_{a,t-\Delta t}$ and $\Delta P^{min}$ is a lower limit of the power difference between $P_{a,t}$ and $P_{a,t-\Delta t}$; and
the spatial coupling constraints are expressed by $$\left(\sum_{a=1}^{A}P_{a,t}\right)^{min} \leq \sum_{a=1}^{A}P_{a,t} \leq \left(\sum_{a=1}^{A}P_{a,t}\right)^{max} \text{ where } \left(\sum_{a=1}^{A}P_{a,t}\right)^{max}$$

is an upper limit of a sum of the output powers of charging stations in A areas at the moment t, $$\left(\sum_{a=1}^{A}P_{a,t}\right)^{min}$$

is a lower limit of the sum of the output powers of the charging stations in A areas at the moment t.

7. The method of claim 6, wherein determining the flexibility range for the fast charging load power and the flexibility range for the energy comprises:
setting upper and lower limits of a charging price range in each aggregation area, and determining there are $2^A$ extreme prices when the extreme price is one of a combination of upper and lower limits of the charging price range in each aggregation area;
constructing the fast charging load power curve and the energy curve of the EV in each aggregation area within the time period $[t_0, t_{end}]$ to be predicted under each extreme price; and
obtaining $2^A$ fast charging load power curves and $2^A$ energy curves of the EV in each aggregation area; and
determining upper and lower limits of the $2^A$ fast charging load power curves as the flexibility range for the fast charging load power, and determining upper and lower limits of the $2^A$ energy curves as the flexibility range for the energy.

8. An electronic device, comprising:
at least one processor; and
a memory communicatively connected with the at least one processor and stored with instructions executable by the at least one processor;
wherein the at least one processor is configured to:
obtain a prediction result on a fast charging demand of each electric vehicle (EV) of a group of EVs based on a preset EV trip chain model;
determine a power distribution area of a substation within an activity range of each EV as an aggregation area, wherein a number of aggregation areas is equal to a number of substations within the activity range of the EV;
establish an area-based aggregation model of each EV corresponding to the aggregation area based on the fast charging demand of the EV, in which the aggregation model includes energy balance equations, energy constraints, power constraints, time coupling constraints and spatial coupling constraints;
obtain a fast charging load power curve and an energy curve of each EV corresponding to the aggregation area based on the area-based aggregation model;
determine upper and lower limits of multiple fast charging load power curves for the EVs as a power flexibility range for the fast charging load power of the EV in the corresponding aggregation area, and determine upper and lower limits of multiple energy curves for the EVs as an energy flexibility range for the energy of the EV in the corresponding aggregation area; and
provide the power flexibility range and the energy flexibility range for a distribution network node corresponding to a substation in each aggregation area, and dispatch the group of EVs in a power grid by using multi-period optimal power flow optimization in combination with the power flexibility range and the energy flexibility range.

9. The electronic device of claim 8, wherein the EV trip chain model comprises:
   a space chain, configured to record a travel site and a travel distance of the EV;
   a time chain, configured to record various time nodes in the driving process of the EV; and
   an energy chain, configured to predict a state-of charge (SOC) of the EV.

10. The electronic device of claim 8, wherein the at least one processor is further configured to:
   select a trip time period $[t_0, t_{out}]$ end to be predicted of each EV, and for each EV at the moment to, obtain a location node distribution, a SOC, a battery capacity, energy consumption per unit distance $e_n$, and a SOC value $Rsoc^j$ ($j \in \{1,2,3,\ldots,N\}$, N is a total number of EVs) when each EV has a fast charging demand; and
   determine the prediction result on the fast charging demand of each EV in the time period $[t_0, t_{out}]$ end by obtaining all subsequent location nodes of each EV in the time period, a moment of each EV reaching each subsequent location node, and a SOC value of each EV reaching each subsequent location node, wherein there is a fast charging demand for any EV j from a location node k−1 to a location node k when the SOC value of the EV j reaching the location node k is less than the corresponding value $Rsoc^j$.

11. The electronic device of claim 8, wherein the at least one processor is further configured to:
   establish a fast charging demand matrix to store the prediction result on the fast charging demand, wherein the fast charge demand matrix comprises a vehicle serial number, start and end points of a trip with the fast charging demand, a selected fast charging station (FCS), start and end time for charging, SOC values at the start and end time for charging.

12. The electronic device of claim 8, wherein the energy balance equation for each aggregation area is expressed by $$E_{a,t} = E_{a,t-\Delta t} + \eta P_{a,\Delta t} \Delta t + E_{a,\Delta t}^{arr} - E_{a,\Delta t}^{dep} - E_{a,L}^{coi}$$

where $E_{a,t}$ is a total energy of EVs located in the area a at the moment t, $E_{a,t-\Delta t}$ is a total energy of EVs located in the area a at the moment t−Δt, η is a conversion efficiency for a charging pile charging to an EV, $P_{a,\Delta t}$ is an average output power of the charging stations in the area a within the time interval Δt, $\eta P_{a,\Delta t} \Delta t$ represents electric quantities of EVs charged by the charging stations in the area a within the time interval Δt, $E_{a,\Delta t}^{arr}$ is the energy carried by the EVs reaching the area a within the time interval, Δt, $E_{a,\Delta t}^{dep}$ is the energy carried by the EVs leaving the area a within the time interval Δt, and $E_{a,\Delta t}^{con}$ is the energy consumed by the EVs driving in the area a within the time interval Δt;

$$\eta P_{a,\Delta t} \Delta t = \int_{t-\Delta t}^{t} \left( \sum_{n=1}^{N} \beta_{n,a}(t) \eta P_{cha} \right) dt$$

$$E_{a,\Delta t}^{arr} = \sum_{n=1}^{N} \left( E_n^{latest} - \int_{t_n^{latest}}^{t_n^{arr}} e_n \left(1 - \sum_{a=1}^{A} \gamma_{n,a}(t)\right) dt \right)$$

$$E_{a,\Delta t}^{dep} = \sum_{n=1}^{N} \left( E_n^{latest} - \int_{t_n^{latest}}^{t_n^{dep}} e_n \left(1 - \sum_{a=1}^{A} \gamma_{n,a}(t)\right) dt \right)$$

$$E_{a,\Delta t}^{con} = \int_{t-\Delta t}^{t} \left( \sum_{n=1}^{N} \alpha_{n,a}(t)(1 - \gamma_{n,a}(t)) e_n \right) dt$$

where A is a total number of aggregation areas, N is a total number of EVs; $P_{cha}$ is a charging power of a single charging pile, $E_n^{latest}$ is the energy of the vehicle n at the moment $t_n^{latest}$ when the latest charging is completed, $t_n^{arr}$ corresponds to a moment when a value of $\alpha_{n,a}(t)$ changes from 0 to 1, $t_n^{dep}$ corresponds to a moment when a value of $\alpha_{n,a}(t)$ changes from 1 to 0, $e_n$ is energy consumption of the vehicle n per unit time, $\alpha_{n,a}(t)$, $\beta_{n,a}(t)$ and $\gamma_{n,a}(t)$ are binary marking variables, $\alpha_{n,a}(t)$ represents an area marking variable of the vehicle n in the area a, in which $\alpha_{n,a}(t)=1$ when the vehicle n is located in the area a at the moment t and $\alpha_{n,a}=0$ when the vehicle n is not located in the area a at the moment t; $\beta_{n,a}(t)$ is a SOC marking variable of the vehicle n in the area a, in which $\beta_{n,a}(t)=1$ when the vehicle n is charged in the area a at the moment t and $\beta_{n,a}(t)=0$ when the vehicle n is not charged in the area a at the moment t; $\gamma_{n,a}(t)$ is a marking variable of a driving state of the vehicle n in the area a, in which $\gamma_{n,a}(t)=1$ when the vehicle n is still in the area a at the moment t and $\gamma_{n,a}(t)=0$ when the vehicle n is not still in the area a at the moment t; $\alpha_{n,a}(t)$, $\beta_{n,a}(t)$ and $\gamma_{n,a}(t)$ are expressed by $$\beta_{n,a}(t) \leq \gamma_{n,a}(t) \leq \alpha_{n,a}(t)$$

$$\sum_{a=1}^{A} \alpha_{n,a}(t) = 1$$

13. The electronic device of claim 8, wherein the energy constraints are expressed by $$E_{a,t}^{min} \leq E_{a,t} \leq E_{a,t}^{max}$$

where $E_{a,t}^{max}$ is an upper limit of a total energy of EVs located in the area a at the moment t, $E_{a,t}^{min}$ is a lower limit of a total energy of EVs located in the area a at the moment t;

the power constraints are expressed by $$P_{a,\Delta t}^{min} \leq P_{a,\Delta t} = \sum_{n=1}^{N} \beta_{n,a} P_{cha} \leq P_{a,\Delta t}^{max}$$

where $P_{a,\Delta t}^{max}$ is an upper limit of an average output power of a charging station in the area a within the time interval Δt and $p_{a,\Delta t}^{min}$ is a lower limit of the average output power of the charging station in the area a within the time interval Δt;

the time coupling constraints are expressed by $$\Delta p^{min} \leq P_{a,t} - P_{a,t-\Delta t} \leq \Delta P^{max}$$

where $P_{a,t}$ is an output power of the charging station in the area a at the moment t, $P_{a,t-\Delta t}$ is an output power of the charging station in the area a at the moment t−Δt, $\Delta p^{max}$ is an upper limit of a power difference between $P_{a,t}$ and $P_{a,t-\Delta t}$ and $\Delta P^{min}$ is a lower limit of the power difference between $P_{a,t}$ and $P_{a,t-\Delta t}$; and the spatial coupling constraints are expressed by $$\left(\sum_{a=1}^{A} P_{a,t}\right)^{min} \leq \sum_{a=1}^{A} P_{a,t} \leq \left(\sum_{a=1}^{A} P_{a,t}\right)^{max} \text{ where } \left(\sum_{a=1}^{A} P_{a,t}\right)^{max}$$

is an upper limit of a sum of the output powers of charging stations in A areas at the moment t, $$\left(\sum_{a=1}^{A} P_{a,t}\right)^{min}$$

is a lower limit of the sum of the output powers of the charging stations in A areas at the moment t.

14. The electronic device of claim 13, wherein the at least one processor is further configured to:
   set upper and lower limits of a charging price range in each aggregation area, and determine there are $2^A$ extreme prices when the extreme price is one of a combination of upper and lower limits of the charging price range in each aggregation area;
   construct the fast charging load power curve and the energy curve of the EV in each aggregation area within the time period $[t_0, t_{end}]$ to be predicted under each extreme price; and
   obtain $2^A$ fast charging load power curves and $2^A$ energy curves of the EV in each aggregation area; and
   determine upper and lower limits of the $2^A$ fast charging load power curves as the flexibility range for the fast charging load power, and determining upper and lower limits of the $2^A$ energy curves as the flexibility range for the energy.

15. A non-transitory computer readable storage medium having computer instructions stored thereon, wherein when the computer instructions are executed by a computer, the computer is caused to implement a method for distribution of a group of electric vehicles (EVs), the method comprising:
   obtaining a prediction result on a fast charging demand of each EV based on a preset EV trip chain model;
   determining a power distribution area of a substation within an activity range of each EV as an aggregation area, wherein a number of aggregation areas is equal to a number of substations within the activity range of the EV;
   establishing an area-based aggregation model of each EV corresponding to the aggregation area based on the fast charging demand of the EV, in which the aggregation model includes energy balance equations, energy constraints, power constraints, time coupling constraints and spatial coupling constraints;
   obtaining a fast charging load power curve and an energy curve of each EV corresponding to the aggregation area based on the area-based aggregation model;
   determining upper and lower limits of multiple fast charging load power curves for the EVs as a power flexibility range for the fast charging load power of the EV in the corresponding aggregation area, and determining upper and lower limits of multiple energy curves for the EVs as an energy flexibility range for the energy of the EV in the corresponding aggregation area; and
   providing the power flexibility range and the energy flexibility range for a distribution network node corresponding to a substation in each aggregation area, and dispatching the group of EVs in a power grid by using multi-period optimal power flow optimization in combination with the power flexibility range and the energy flexibility range.

16. The storage medium of claim 15, wherein the EV trip chain model comprises:
   a space chain, configured to record a travel site and a travel distance of the EV;
   a time chain, configured to record various time nodes in the driving process of the EV; and
   an energy chain, configured to predict a state-of charge (SOC) of the EV.

17. The storage medium of claim 15, wherein obtaining the prediction result on the fast charging demand of each EV comprises:
   selecting a trip time period $[t_0, t_{end}]$ to be predicted of each EV, and for each EV at the moment to, obtaining a location node distribution, a SOC, a battery capacity, energy consumption per unit distance $e_n$, and a SOC value $Rsoc^j$ ($j \in \{1,2,3,\ldots,N\}$, N is a total number of EVs) when each EV has a fast charging demand; and
   determining the prediction result on the fast charging demand of each EV in the time period $[t_0, t_{end}]$ by obtaining all subsequent location nodes of each EV in the time period, a moment of each EV reaching each subsequent location node, and a SOC value of each EV reaching each subsequent location node, wherein there is a fast charging demand for any EV j from a location node k-1 to a location node k when the SOC value of the EV j reaching the location node k is less than the corresponding value $Rsoc^j$.

18. The storage medium of claim 17, wherein the computer is caused to further implement:
   establishing a fast charging demand matrix to store the prediction result on the fast charging demand, wherein the fast charge demand matrix comprises a vehicle serial number, start and end points of a trip with the fast charging demand, a selected fast charging station (FCS), start and end time for charging, SOC values at the start and end time for charging.

19. The storage medium of claim 15, wherein the energy balance equation for each aggregation area is expressed by $$E_{a,t} = E_{a,t-\Delta t} + \eta P_{a,\Delta t} \Delta t + E_{a,\Delta t}^{arr} - E_{a,\Delta t}^{dep} - E_{a,L}^{con}$$

where $E_{a,t}$ is a total energy of EVs located in the area a at the moment t, $E_{a,t-\Delta t}$ is a total energy of EVs located in the area a at the moment $t-\Delta t$, $\eta$ is a conversion efficiency for a charging pile charging to an EV, $P_{a,\Delta t}$ is an average output power of the charging stations in the area a within the time interval $\Delta t$, $\eta P_{a,\Delta t} \Delta t$ represents electric quantities of EVs charged by the charging stations in the area a within the time interval $\Delta t$, $E_{a,\Delta t}^{arr}$ is the energy carried by the EVs reaching the area a within the time interval, $\Delta t$, $E_{a,\Delta t}^{dep}$ is the energy carried by the EVs leaving the area a within the time interval $\Delta t$, and $E_{a,\Delta t}^{con}$ is the energy consumed by the EVs driving in the area a within the time interval $\Delta t$;

$$\eta P_{a,\Delta t} \Delta t = \int_{t-\Delta t}^{t} \left(\sum_{n=1}^{N} \beta_{n,a}(t) \eta P_{cha}\right) dt$$

$$E_{a,\Delta t}^{arr} = \sum_{n=1}^{N} \left(E_n^{latest} - \int_{t_n^{latest}}^{\tau_n^{arr}} e_n \left(1 - \sum_{a=1}^{A} \gamma_{n,a}(t)\right) dt\right)$$

$$E_{a,\Delta t}^{dep} = \sum_{n=1}^{N} \left(E_n^{latest} - \int_{t_n^{latest}}^{\tau_n^{dep}} e_n \left(1 - \sum_{a=1}^{A} \gamma_{n,a}(t)\right) dt\right)$$

$$E_{a,\Delta t}^{con} = \int_{t-\Delta t}^{t} \left(\sum_{n=1}^{N} \alpha_{n,a}(t)(1 - \gamma_{n,a}(t)) e_n\right) dt$$

where A is a total number of aggregation areas, N is a total number of EVs; $P_{cha}$ is a charging power of a single charging pile, $E_n^{latest}$ is the energy of the vehicle n at the moment $t_n^{latest}$ when the latest charging is completed, $t_n^{arr}$ corresponds to a moment when a value of $\alpha_{n,a}(t)$ changes from 0 to 1, $t_n^{dep}$ corresponds to a moment when a value of $\alpha_{n,a}(t)$ changes from 1 to 0, $e_n$ is energy consumption of the vehicle n per unit time, $\alpha_{n,a}(t)$ $\beta_{n,a}(t)$ and $\gamma_{n,a}(t)$ are binary marking variables, $\alpha_{n,a}(t)$ represents an area marking variable of the vehicle n in the area a, in which $\alpha_{n,a}(t)=1$ when the vehicle n is located in the area a at the moment t and $\alpha_{n,a}=0$ when the vehicle n is not located in the area a at the moment t; $\beta_{n,a}(t)$ is a SOC marking variable of the vehicle n in the area a, in which $\beta_{n,a}(t)=1$ when the vehicle n is charged in the area a at the moment t and $\beta_{n,a}(t)=0$ when the vehicle n is not charged in the area a at the moment t; $\gamma_{n,a}(t)$ is a marking variable of a driving state of the vehicle n in the area a, in which $\gamma_{n,a}(t)=1$ when the vehicle n is still in the area a at the moment t and $\gamma_{n,a}(t)=0$ when the vehicle n is not still in the area a at the moment t; $\alpha_{n,a}(t)$, $\beta_{n,a}(t)$ and $\gamma_{n,a}(t)$ are expressed by $$\beta_{n,a}(t) \leq \gamma_{n,a}(t) \leq \alpha_{n,a}(t)$$

$$\sum_{a=1}^{A}\alpha_{n,a}(t) = 1$$

the energy constraints are expressed by $$E_{a,t}^{min} \leq E_{a,t} \leq E_{a,t}^{max}$$

where $E_{a,t}^{max}$ is an upper limit of a total energy of EVs located in the area a at the moment t, $E_{a,t}^{min}$ is a lower limit of a total energy of EVs located in the area a at the moment t;
the power constraints are expressed by $$P_{a,\Delta t}^{min} \leq P_{a,\Delta t} = \sum_{n=1}^{N}\beta_{n,a}P_{cha} \leq P_{a,\Delta t}^{max}$$

where $P_{a,\Delta t}^{max}$ is an upper limit of an average output power of a charging station in the area a within the time interval $\Delta t$ and $p_{a,\Delta t}^{min}$ is a lower limit of the average output power of the charging station in the area a within the time interval $\Delta t$;
the time coupling constraints are expressed by $$\Delta p^{min} \leq P_{a,t} - P_{a,t-\Delta t} \leq \Delta p^{max}$$

where $P_{a,t}$ is an output power of the charging station in the area a at the moment t, $P_{a,t-\Delta t}$ is an output power of the charging station in the area a at the moment t-$\Delta t$, $\Delta p^{max}$ is an upper limit of a power difference between $P_{a,t}$ and $P_{a,t-\Delta t}$ and $\Delta p^{min}$ is a lower limit of the power difference between $P_{a,t}$ and $P_{a,t-\Delta t}$; and
the spatial coupling constraints are expressed by $$\left(\sum_{a=1}^{A}P_{a,t}\right)^{min} \leq \sum_{a=1}^{A}P_{a,t} \leq \left(\sum_{a=1}^{A}P_{a,t}\right)^{max} \text{ where } \left(\sum_{a=1}^{A}P_{a,t}\right)^{max}$$

is an upper limit of a sum of the output powers of charging stations in A areas at the moment t, $$\left(\sum_{a=1}^{A}P_{a,t}\right)^{min}$$

is a lower limit of the sum of the output powers of the charging stations in A areas at the moment t.

20. The storage medium of claim 19, wherein determining the flexibility range for the fast charging load power and the flexibility range for the energy comprises:
setting upper and lower limits of a charging price range in each aggregation area, and determining there are $2^A$ extreme prices when the extreme price is one of a combination of upper and lower limits of the charging price range in each aggregation area;
constructing the fast charging load power curve and the energy curve of the EV in each aggregation area within the time period $[t_0, t_{end}]$ to be predicted und price; and obtaining $2^A$ fast charging load power curves and $2^A$ energy curves of the EV in each aggregation area; and
determining upper and lower limits of the $2^A$ fast charging load power curves as the flexibility range for the fast charging load power, and determining upper and lower limits of the $2^A$ energy curves as the flexibility range for the energy.

* * * * *